United States Patent
Konstantin

(10) Patent No.: US 10,821,894 B2
(45) Date of Patent: Nov. 3, 2020

(54) METHOD AND DEVICE FOR VISUAL INFORMATION ON A VEHICLE DISPLAY PERTAINING TO CROSS-TRAFFIC

(71) Applicant: FORD GLOBAL TECHNOLOGIES, LLC, Dearborn, MI (US)

(72) Inventor: Dragosch Konstantin, Nordrhein Westfalen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/407,580

(22) Filed: May 9, 2019

(65) Prior Publication Data
US 2019/0381935 A1 Dec. 19, 2019

(30) Foreign Application Priority Data

May 9, 2018 (DE) .......................... 10 2018 207 233

(51) Int. Cl.
*B60Q 1/00* (2006.01)
*B60R 1/00* (2006.01)
*G01S 13/931* (2020.01)

(52) U.S. Cl.
CPC .............. *B60R 1/00* (2013.01); *G01S 13/931* (2013.01); *B60R 2300/301* (2013.01); *B60R 2300/8066* (2013.01); *B60R 2300/8093* (2013.01)

(58) Field of Classification Search
CPC .............. B60R 1/00; B60R 2300/8093; B60R 2300/8066; B60R 2300/301;
(Continued)

(56) References Cited

U.S. PATENT DOCUMENTS 10,106,153 B1 * 10/2018 Xiao ..................... B60W 30/06
2005/0022753 A1 2/2005 Nakamura
(Continued)

FOREIGN PATENT DOCUMENTS

DE 10329054 A1 1/2005
DE 102011116771 A1 4/2013
(Continued)

OTHER PUBLICATIONS

DE Examination Report DE 10 2018 207 233.7, Filed Oct. 26, 2018, 9 pages.

*Primary Examiner* — Tanmay K Shah
(74) *Attorney, Agent, or Firm* — Frank Lollo; Brooks Kushman P.C.

(57) ABSTRACT

A vehicle includes a display device, a radar sensor having a detection region perpendicular to a vehicle longitudinal axis, a radar analyzer connected to the radar sensor, and a camera having a switchable field of view for covering an angular range behind the vehicle direction between a narrower angular range and a wider angular range. The display device is configured to display an image from the camera, at the narrower range, responsive to a sensor sensing vehicle movement in a direction included in a field of view of the camera, and the display device is configured to display an image from the camera at the wider range, responsive to the radar sensor detecting an object moving towards the vehicle. The vehicle may also be configured to automatically stop responsive to certain characteristics of objects detected by the radar sensor.

19 Claims, 2 Drawing Sheets

(58) Field of Classification Search
CPC ............. B60R 2300/404; G01S 13/931; G01S 13/867; G01S 13/87; G01S 2013/93185; G01S 2013/93272; G01S 2013/93274; G01S 2013/9315; B60W 30/08; G08G 1/16
USPC ........................................................ 340/435
See application file for complete search history.

(56) References Cited

U.S. PATENT DOCUMENTS

| | | | |
|---|---|---|---|
| 2009/0292468 A1 | 11/2009 | Wu et al. | |
| 2012/0062743 A1* | 3/2012 | Lynam ................... | B60Q 9/005 348/148 |
| 2015/0109444 A1 | 4/2015 | Zhang et al. | |

FOREIGN PATENT DOCUMENTS

| | | |
|---|---|---|
| DE | 102013013253 A1 | 2/2015 |
| DE | 102014111186 A1 | 2/2015 |
| DE | 102014225883 A1 | 6/2016 |

* cited by examiner

METHOD AND DEVICE FOR VISUAL INFORMATION ON A VEHICLE DISPLAY PERTAINING TO CROSS-TRAFFIC

CROSS-REFERENCE TO RELATED APPLICATIONS

This application claims foreign priority benefits under 35 U.S.C. § 119(a)-(d) to DE Application 10 2018 207 233.7 filed May 9, 2018, which are hereby incorporated by reference in their entirety.

TECHNICAL FIELD

The illustrative embodiments relate to a method and a device for informing about cross-traffic pictorially and pictorially on a display device of a driven vehicle.

BACKGROUND

Vehicles may include a device which, during reversing, such as backwards out of a parking space, activates a camera and displays the image data therefrom on a display device. It is thereby possible to detect vehicles approaching behind from the right or left or another hazard. The vehicle driver is warned by visual and audible signals if such a vehicle or another object is detected. The object may be displayed to the driver on the display device. The camera may perform the detection in an angular range of approximately 135°. This angular range is centered about an x-direction, which runs in the longitudinal direction of the vehicle. These camera systems may struggle to detect changes along the Y axis, however, being generally configured to detect along the horizontal.

The image signal from a camera may depend on light conditions. The image signal from the camera may thus be impacted by weather conditions. Although infrared cameras, which output an image even at night, can be used, these cameras tend to have a limited range and resolution and again have an image signal that may depend on weather conditions.

SUMMARY

In a first illustrative embodiment, a method for automatically informing about cross-traffic pictorially on a display device of a driven vehicle, which is described by an x-axis extending in the vehicle longitudinal direction, a y-axis extending orthogonal thereto in the vehicle plane, and a z-axis extending orthogonal to the vehicle plane, utilizes a radar sensor which has a detection region that includes an angular range about the y-direction in the vehicle plane. The method also utilizes a radar analyzer, which is connected to the radar sensor and a camera connected to the display device, the camera having a switchable field of view for covering an angular range about the x-direction between a narrow angular range x plus/minus alpha, where alpha is less than 70°, and a wide angular range, which includes x plus/minus 90°.

The method includes activating the radar sensor and activating the camera when a gear is engaged or the vehicle starts to roll in the direction of the field of view of the camera. The method also includes operating the camera in the narrow angular range. The method further includes monitoring, in the radar analyzer, the signal from the radar sensor to determine whether an object, in particular a moving object, is ascertained in a narrow angular range about the y-direction. Also, the method includes outputting a switching signal if such an object is detected and operating the camera in the wide angular range responsive to the switching signal.

In a second illustrative embodiment, a vehicle includes a display device, a radar sensor having a detection region perpendicular to a vehicle longitudinal axis, a radar analyzer connected to the radar sensor, and a camera having a switchable field of view for covering an angular range behind the vehicle direction between a narrower angular range and a wider angular range. The display device is configured to display an image from the camera, at the narrower range, responsive to a sensor sensing vehicle movement in a direction included in a field of view of the camera, and the display device is configured to display an image from the camera at the wider range, responsive to the radar sensor detecting an object moving towards the vehicle.

In a third illustrative embodiment, a method includes engaging a first motion detector responsive to determining a vehicle is moving in a reverse direction and, responsive to detecting an object, other than the vehicle, in motion via the motion detector, changing a displayed camera view, displayed on a vehicle display, for a camera viewing an area behind the vehicle, to a wider-angle view than before the object was detected in motion.

DETAILED DESCRIPTION

Figure 1:
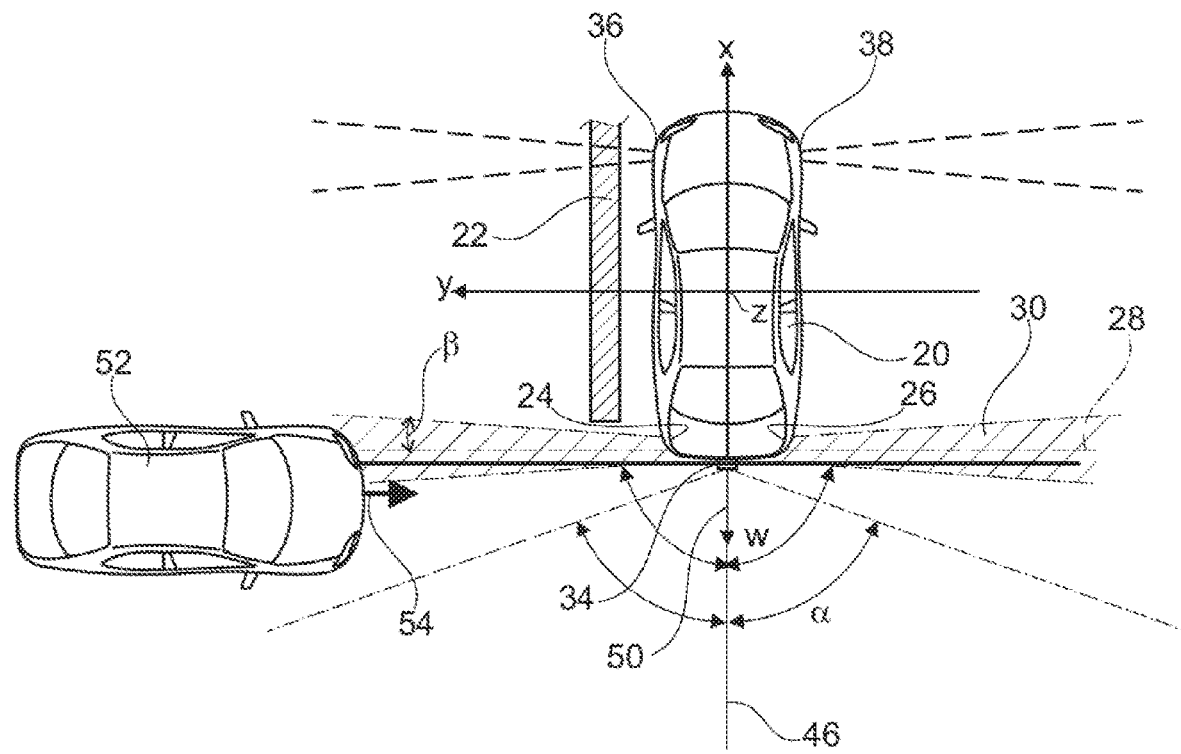
FIG. 1 shows a view of a traffic situation comprising a driven vehicle and a vehicle constituting cross-traffic.

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

The illustrative embodiments may assist a driver in obtaining information about side-approaching objects when the driver's view is restricted.

For example, a vehicle may obtain information about, and display information about cross-traffic pictorially on a display device of a driven vehicle, which is described by an x-axis extending in the vehicle longitudinal direction, a y-axis extending orthogonal thereto in the vehicle plane, and a z-axis extending orthogonal to the vehicle plane.

In one illustrative embodiment, this may be done using a system that includes a radar sensor, which has a detection region that includes an angular range about the y-direction in the vehicle plane, and a radar analyzer, which is connected to the radar sensor. The example embodiment may also include a camera, which has a switchable field of view for covering an angular range about the x-direction. The range may be between a narrow angular range x plus/minus alpha, where alpha may be less than 90° and in, one embodiment, less than 70°, and a wide angular range x plus/minus w, which includes x plus/minus 90°. A plurality of radar sensors can also be used instead of one radar sensor.

The radar sensor may be used to detect objects in the lateral region, in particular cross-traffic. It can be determined from the radar signal, such as by using the Doppler technique, whether the cross-traffic is moving. If the result of the analysis of the radar signal is a signal from an object, for instance cross-traffic, a switching signal is output. The output can be made dependent on whether the cross-traffic is approaching or going away, and whether it is moving.

The switching signal may cause the camera to leave the narrow angular range of, for example, 135°, being captured until then, or even to switch from an inactive state (camera may not even have shown any image at all previously before switching into the 180° angular range state) and into a wide angular range, said wide angular range typically being around 180°, but which may extends at least to 190° or more. The x-direction is in the center again in this wide angular range.

Using the wide angular range that now exists, a driver can identify the type of object involved that was detected by the radar sensor. For example, if it is a stationary object such as a tree, the driver may take account of the position of the tree when making a travel movement.

If it is a moving object, the driver may monitor, for example, whether the object is actually coming towards the driver or moving away from the driver, and act with caution, possibly waiting until the hazard is past. If the object is moving is the case, a view of the object may also be displayed to the driver, because the camera remains in the wide angular range. The sustained switching signal, like the switch-off signal and hence the retention of the image, can be set freely. Thus, the image can remain for a defined, freely selectable (configurable, extended or shortened) passage of time. (For example, another 10 sec or until an infinite time after the switch-off signal).

Even switching the image on the display device from the display normally present or from the inactive state of the camera of the narrow angular range to the display of the wide angular range may cause a change that a driver may notices. In addition, the switching can be augmented and reinforced by further notifications to the driver, for instance an audible or visible notification can be given.

The switching signal from the radar analyzer may be used for the automatic switching of the camera. The switching signal can be derived just from the simple echo signal from the radar. If the speed of the object is additionally determined, there is extra information available, and this extra information can be used for an additional altering of the driver. For instance, an additional alert can be output if it is ascertained that cross-traffic is approaching at excessive speed.

A stop device for the vehicle may be connected to the radar analyzer of the radar sensor and, in the activated state, may prevent the vehicle moving in the direction of view of the camera. The radar analyzer may output a stop signal, which may activates a brake when an object, in particular a moving object, is located within a closer portion of the detection region of the radar sensor. Such a stop signal can also be output if approaching cross-traffic at excessive speed has been ascertained. The threshold value of the portion to be detected and for triggering a stop signal is freely configurable.

The illustrative vehicle is described by a right-hand, orthogonal x, y, z coordinate system. The x axis extends in the longitudinal direction of the vehicle and with positive values towards the front. The y-axis extends orthogonal thereto in the vehicle plane, with positive values to the left when the vehicle is viewed from above. These two axes lie in the page plane of the drawing. The z-axis extends vertically with positive values upwards. A direction parallel to the x-axis is denoted as the x-direction, and so on, as shown in FIG. 1.

The illustrative embodiments relate to informing about cross-traffic both during travel in the normal direction of travel, i.e. in the positive x-direction (including possible components in the y-direction), and during reversing, i.e. in the negative x-direction (plus possible components in the y-direction), or when the vehicle is stationary (with radar sensor active). In at least on embodiment at least one radar sensor and a camera are arranged on the rear of the vehicle and primarily cover the negative X direction relative to the above coordinate system.

For the radar sensors to be able to cover the y-direction, they may require an unobstructed view in this direction. Similar to the at least one camera, they can be arranged on the vehicle as far to the rear as possible and/or as far to the front as possible. As a result, in one embodiment, a camera may be arranged centrally at the rear and, if applicable, a camera may be arranged centrally at the front. In this embodiment, a first radar sensor is mounted on the rear left and a second radar sensor on the rear right on the vehicle. In addition, a third and a fourth radar sensor can be arranged at the front at the front vehicle corners. The radar sensors are preferably arranged at a vehicle corner or at least in the vicinity thereof.

The detection region and also the field of view of the camera are always directed away from the vehicle.

The radar sensors may also have a beam angle in the y-z plane, which can be fairly small, for instance can lie in the range of 10 to 30°, in particular 5 to 20°. The same applies to the beam angle of the at least one camera in the x-z plane. In this case, again the beam angle can lie in the range of 10 to 30°, in particular 5 to 20°. The total vertical beam angle of the camera is typically approximately 107° (above+below). Radar sensors that have a conical detection region may be used. A built-in display of the vehicle may be used as the display device. The illustrative embodiments may use a camera that has an angular range that can be switched between a wide angular range and a narrow angular range.

Figure 2:
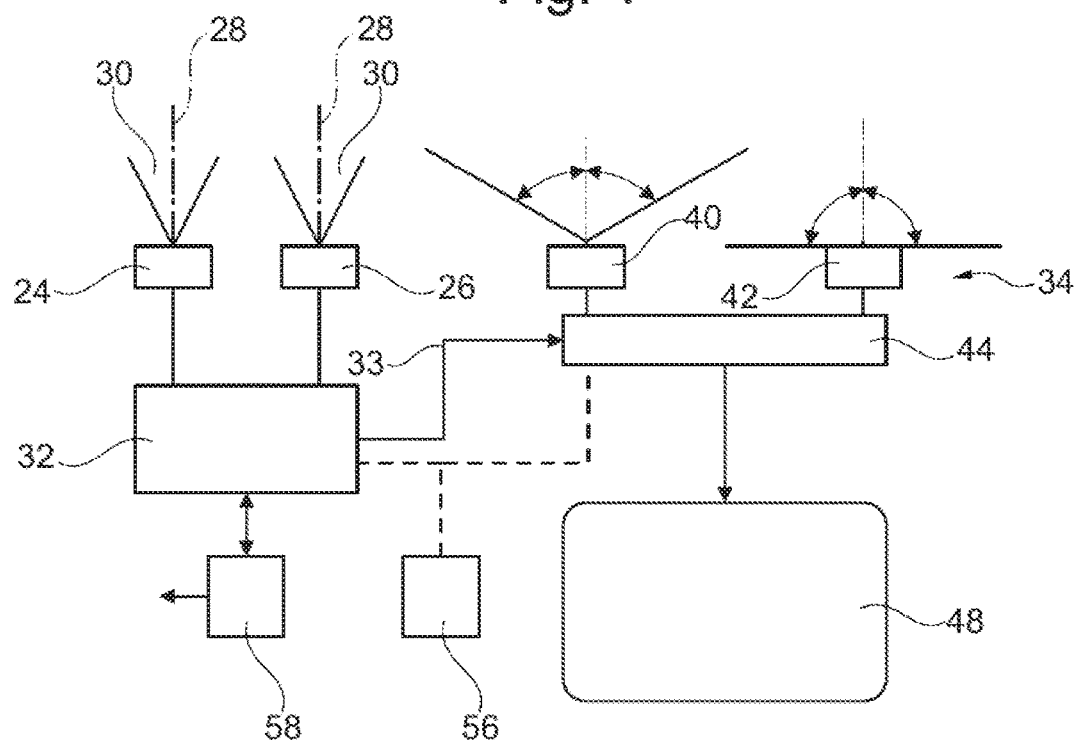
FIG. 2 shows an illustrative schematic diagram of the vehicle components for detection and alerting.

FIG. 1 shows a vehicle 20 parked beside a wall 22 located to the left of the vehicle, and FIG. 2 shows an illustrative schematic diagram of the vehicle components for detection and alerting. The vehicle 20 is defined by an x-axis extending in the longitudinal direction of the vehicle 20, in the figure running with positive values upwards in the drawing plane, a y-axis extending orthogonal thereto, in the figure running with positive values to the left in the drawing plane, and a z-axis, extending perpendicular to the drawing plane, with positive values upwards. The vehicle 20 is fitted with a first radar sensor 24 in its rear left corner, and with a second radar sensor 26 in its rear right corner. Each has a central beam 28, which extends substantially parallel to the y-axis. A detection region 30 extends about this central beam 28 and is identified by hatching. As FIG. 1 shows, the detection regions 30 extend away from the vehicle 20. In the case shown, they extend to the left for the first radar sensor 24, and to the right for the second radar sensor 26.

The two radar sensors 24, 26 are connected to a radar analyzer 32 that may be connected on the output side via a signal line 33 to the camera 34 directly or via at least one additional electrical module. The camera is also referred to as a reversing camera. The vehicle 20 can also comprise a forward camera (not shown). The vehicle 20 depicted, however, additionally has a third radar sensor 36 and a fourth radar sensor 38 in its front region.

In order to simplify the description and explanation, FIG. 2 shows the camera 34 in its constituent parts, specifically comprising an objective 40 having a narrow angular range, comprising an objective 42 having a wide angular range, and comprising an acquisition part 44. This design of the camera 34 is one possible embodiment. The actual design usually does not have two separate objectives 40, 42.

Electronic measures for changing the field of view of the camera 34 can be provided, etc. The camera used can hence have just one objective that covers 190° in the horizontal. Switching between the (standard) narrower angle (approximately 136°) and the wide 180°-190° angle may thus also be performed merely in the camera software.

The camera 34 (regardless of its current objective 40, 42) has a central beam 46, which extends generally in the x-direction; for the reversing camera it extends in a negative x-direction, and in the specific exemplary embodiment of FIG. 1, in the x axis. The field of view of the camera 34 can hence be defined in relation to the x axis.

For the case of the narrow angular range, it may be defined by an angle alpha. For the narrow angular range, the value of the angular range equals x plus/minus alpha, where alpha has the value 68°, for example. The angle of view or angular range thus equals 136°. For the case of the wide angular range, the field of view may be correspondingly defined by an angle w. The value of the angle w for the wide angular range equals 90° or even 95°. This is what is meant by the wide angular range.

The image signal or imaging signal from the camera 34 is displayed on a display device 48. If applicable, the raw image from the camera is also corrected by the camera software for any distortion, with the result that it is edited before going to the display device. The image signal is preferably sent in full/without limitations to the display device without the signal being edited.

Switching between narrow angle of view (e.g., 140° max.) and wide angle of view (e.g., 190° max.) may be performed by means of a switching signal, which is generated in the radar analyzer 32 and transferred to the camera 34 via the line 33. If, and for as long as, it exists, plus, if applicable, a time $t_x$, which is freely configurable, the camera shows an image having a wide angle of view (190° max.). A certain time lag $t_x$ can preferably be adjustable in order to prevent over-frequent changing of the image. The narrow angular range is typically in use in one embodiment, when the switching signal is not applied.

FIG. 1 shows the problem when the intention is to drive the vehicle 20 out of the parked state backwards in the direction of the arrow 50, or the vehicle is rolling in a similar manner. FIG. 1 shows on the left a second vehicle 52, which constitutes the cross-traffic. It is moving along an arrow 54 in the negative y-direction. A driver (not shown) sitting in the driven vehicle 20 cannot visually detect this second vehicle 52 when looking to the left, because the wall 22 is obstructing the view.

As FIG. 1 shows, however, the second vehicle 52, which constitutes the cross-traffic, lies in the detection region of the first radar sensor 24. If the driver of the driven vehicle 20 now gets ready to reverse, or if the driver's vehicle is even just rolling backwards, this movement may be detected by a sensor 56. This sensor 56 can be assigned, for example, to the reverse gear and/or to a movement of the vehicle. As soon as the sensor 56 detects a gear being engaged and/or the vehicle 20 starting to roll in the direction of the field of view of the camera 34, it activates both radar sensors 24, 26 and the camera 34. It is also possible, however, that these are already activated. The driver sees on the display device 48 an image of the situation behind his vehicle 20. The camera 34 is in the normal state at this stage, so in the narrow angular range. In this angular range, the driver cannot see the second vehicle 52; see the dashed line for the field of view having the narrow angular range in FIG. 1.

The first radar sensor 24, however, detects the second vehicle 52. A switching signal is given to the camera 34 by means of the radar analyzer 32. This signal causes the camera to switch into the wide angular range. In this angular range, the driver can now see the second vehicle 52; see wide angular range in FIG. 1. The image shown on the display device 48 has changed in the process. If it is wished to give an additional notification, an alert signal can also be output.

FIG. 2 also shows a stop device 58 able to prevent movement of the driven vehicle 20. The stop device 58 (e.g., a brake) may be actuated if the radar sensor that is performing the detection, in this case the radar sensor 24, detects a corresponding signal, and this signal is assessed in the radar analyzer 32 as exceeding a threshold value for the proximity and/or speed of the approaching second vehicle 52. This prevents the vehicle 20 from moving further in the direction of the arrow 50.

The detection region 30 of the radar sensor may be partitioned into a near field and a far field. The detection region 30 extends over 30 m, for example. The first 10 m are defined as the near region. In this near region, lower specified values apply to actuating the stop device 58 than in the far region.

Figure 3:
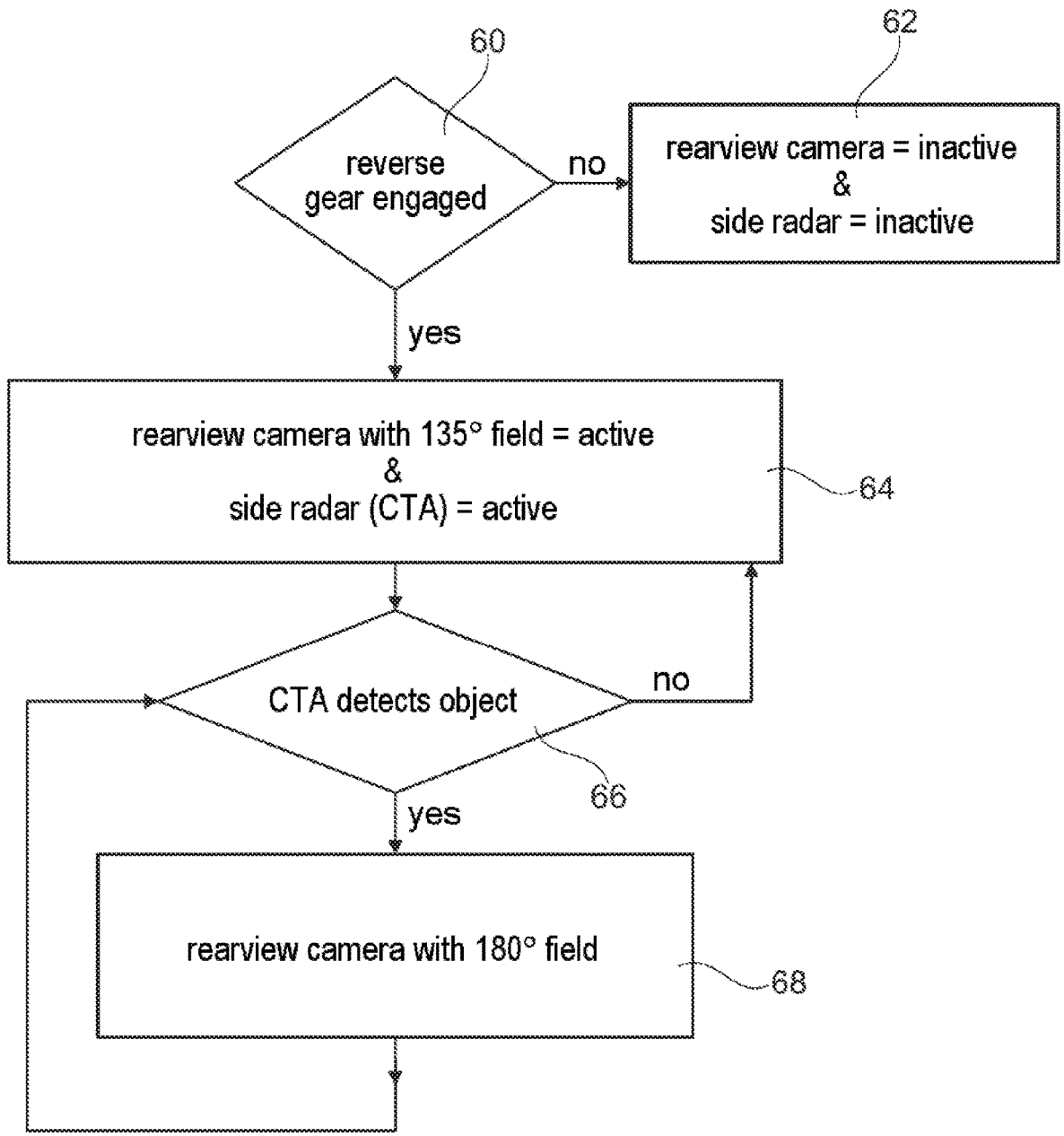
FIG. 3 is a flow diagram for illustrating the method.

FIG. 3 shows a flow diagram. In the first step 60, a vehicle 20 determines whether or not a reverse gear is engaged and/or whether the vehicle is rolling backwards. This corresponds to the sensor 56 detecting whether a movement of the vehicle 20 in the direction of view of the camera 34 is imminent. If this is not the case, the system remains in the state 62 and the radar sensors 24, 26, 36, 38 remain inactive. In this state 62, the camera 34 likewise remains inactive.

If the vehicle is moving, however, the system shifts into the state 64 and a) the camera 34 becomes active and supplies an image signal to the display device 48, on which an image is displayed as might also be seen in the rearview mirror. In this case, the camera 34 is in the narrow angular range. In addition, b) the radar sensors currently involved, so for instance the rear radar sensors 24, 26, are activated.

Then, in a second step 66, it is determined in the radar analyzer 32 whether or not a radar sensor is detecting an object. If it does not detect an object, the system remains in the state 64. If, however, an object is detected, the system goes into the state 68. In this case, the camera 34 is switched into the wide angular range and the corresponding image is displayed on the display device 48. This state is monitored continuously and remains in force until an object is no longer detected, preferably plus a time $t_x$, which can be set/configured freely.

The method for informing about cross-traffic pictorially in an automatically displayed manner on a display device 48 of a driven vehicle 20 uses a radar sensor 24, which has a detection region 30 that includes an angular range orthogonal to the vehicle longitudinal direction in the vehicle plane, and a camera 34, which has a switchable field of view for covering an angular range about the vehicle longitudinal direction between a) a narrow angular range and a wider angular range, which may include 180° or more.

The following method steps may be carried out by one or more vehicle processors and/or microcontrollers: activating the radar sensor 24 and activating the camera 34 when the reverse gear is engaged and/or there is notification of the vehicle rolling in the direction of the field of view of the camera 34, operating the camera 34 in the narrow angular range 40, monitoring the signal from the radar sensor 24 to determine whether an object, in particular a moving object, is ascertained orthogonal to the vehicle longitudinal direction, and outputting a switching signal if such an object is detected, and operating the camera 34 in the wide angular range 42 as soon as a switching signal is present.

Applicant reserves the right to combine in any manner any features and also sub-features from the claims and/or any features and also partial features from a sentence in the description with other features, sub-features or partial features, even if this goes beyond the features of the independent claims. With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A method for automatically informing about cross-traffic pictorially on a display device of a driven vehicle, which is described by an x-axis extending in the vehicle longitudinal direction, a y-axis extending orthogonal thereto in the vehicle plane, and a z-axis extending orthogonal to the vehicle plane, the method utilizing
   a radar sensor which has a detection region that includes an angular range about the y-direction in the vehicle plane,
   a radar analyzer, which is connected to the radar sensor, and a camera connected to the display device, the camera having a switchable field of view for covering an angular range about the x-direction between a narrow angular range x plus/minus alpha, where alpha is less than 70°, and a wide angular range,
   which includes x plus/minus 90°, the method comprising:
   activating the radar sensor and activating the camera when a gear is engaged or the vehicle starts to roll in the direction of the field of view of the camera;
   operating the camera in the narrow angular range;
   monitoring, in the radar analyzer, the signal from the radar sensor to determine whether an object, in particular a moving object, is ascertained in a narrow angular range about the y-direction;
   outputting a switching signal if such an object is detected, operating the camera in the wide angular range responsive to the switching signal, wherein the camera reverts from the wide angular range once the radar sensor no longer ascertains the moving object in the narrow angular range.

2. A vehicle comprising:
   a display device;
   a radar sensor having a detection region perpendicular to a vehicle longitudinal axis;
   a radar analyzer connected to the radar sensor;
   a camera having a switchable field of view for covering an angular range behind the vehicle direction between a narrower angular range and a wider angular range, wherein the display device is configured to display an image from the camera, at the narrower range, responsive to a sensor sensing vehicle movement in a direction included in a field of view of the camera, and the display device is configured to display an image from the camera at the wider range, responsive to the radar sensor detecting an object moving towards the vehicle, wherein the radar analyzer outputs a stop signal, which stops vehicle motion, when the object is located within a predefined portion of the detection region.

3. The vehicle of claim 2, wherein the radar sensor and the camera are arranged on the rear of the vehicle.

4. The vehicle of claim 3, wherein the radar sensor includes a plurality of radar sensors, including at least a first radar sensor on a rear left corner of the vehicle, and a second radar sensor on a rear right corner of the vehicle.

5. The vehicle of claim 2, wherein the radar analyzer outputs a stop signal, which stops vehicle motion, when the object is located within a predefined portion of the detection region predefined as a near region that is less than a maximum range of the detection region.

6. The vehicle of claim 2, wherein the radar analyzer outputs a stop signal, which stops vehicle motion, when the object is determined to be moving at a speed above a predetermined threshold.

7. A method comprising:
   engaging a first motion detector responsive to determining a vehicle is moving in a reverse direction; and
   responsive to detecting an object, other than the vehicle, in motion via the motion detector, changing a displayed camera view, displayed on a vehicle display, for a camera viewing an area behind the vehicle, to a wider-angle view than before the object was detected in motion, wherein the wider-angle view reverts to the view before the object was detected in motion responsive to the object no longer being detected by the motion detector.

8. The method of claim 7, wherein the motion detector includes a radar sensor.

9. The method of claim 7, wherein the vehicle moving in a reverse direction includes powered reversing.

10. The method of claim 7, wherein the vehicle moving in a reverse direction includes the vehicle rolling backwards.

11. The method of claim 7, wherein the camera views an area that covers the area behind the vehicle for less than 180 degrees before the object was detected in motion.

12. The method of claim 7, wherein the camera views an area, in the wider-angle view, that covers the area behind the vehicle for over 180 degrees.

13. The method of claim 7, wherein the method further comprises automatically stopping the vehicle responsive to detecting the object in motion.

14. The method of claim 13, wherein the stopping is responsive to detecting the object in motion and further in motion towards a location of the vehicle.

15. The method of claim 14, wherein the location of the vehicle includes a location the vehicle is likely to occupy based on the determined motion.

16. The method of claim 13, wherein the stopping is further responsive to detecting the object in motion at a location within a predefined distance of the location of the vehicle.

17. The method of claim 13, wherein the stopping is responsive to detecting the object in motion moving at above a predetermined speed.

18. The method of claim 7, wherein the changing a displayed camera is responsive to detecting the object in motion and further in motion towards a location of the vehicle.

19. The method of claim 18, wherein the location of the vehicle includes a location the vehicle is likely to occupy based on the determined motion.

\* \* \* \* \*